United States Patent
Strulo et al.

(10) Patent No.: US 9,525,565 B2
(45) Date of Patent: Dec. 20, 2016

(54) CAPACITY ADAPTATION BETWEEN SERVICES OR CLASSES IN A PACKET NETWORK

(75) Inventors: Ben Strulo, London (GB); Gabriele Corliano, London (GB); Marc Wennink, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 259 days.

(21) Appl. No.: 13/583,260

(22) PCT Filed: Mar. 3, 2011

(86) PCT No.: PCT/GB2011/000290
§ 371 (c)(1),
(2), (4) Date: Sep. 7, 2012

(87) PCT Pub. No.: WO2011/110801
PCT Pub. Date: Sep. 15, 2011

(65) Prior Publication Data
US 2013/0039187 A1    Feb. 14, 2013

(30) Foreign Application Priority Data
Mar. 9, 2010 (EP) .................................... 10250431

(51) Int. Cl.
*H04L 12/24* (2006.01)
*H04L 12/54* (2013.01)
(Continued)

(52) U.S. Cl.
CPC ........... *H04L 12/5695* (2013.01); *H04L 47/76* (2013.01); *H04L 47/805* (2013.01)

(58) Field of Classification Search
CPC .......... H04L 12/24; H04L 12/66; H04W 80/00
See application file for complete search history.

(56) References Cited

U.S. PATENT DOCUMENTS

| 2006/0149854 A1* | 7/2006 | Rudkin et al. ................ 709/241 |
| 2007/0242653 A1* | 10/2007 | Yang ..................... H04L 1/0006 370/342 |

(Continued)

OTHER PUBLICATIONS

Shelford et al., "Achieving optimal revenues in dynamically priced network services with QoS guarantees", *Computer Networks*, vol. 51, No. 11, May 23, 2007, pp. 3294-3304.

(Continued)

*Primary Examiner* — Anez Ebrahim
(74) *Attorney, Agent, or Firm* — Nixon & Vanderhye P.C.

(57) ABSTRACT

A method and system is described that adjusts the allocated capacity of a network between services, or service or traffic classes, in dependence on a congestion-influenced shadow price indication in respect of each service or class. In this respect, instead of viewing the congestion price as a cost of using already allocated unit of capacity, such a shadow price indication can be viewed as an indicator of the value obtainable from allocating an extra unit of capacity to a service or class. By so doing the shadow price indication becomes a factor to be taken into account in deciding on capacity allocation between services or classes, with a high shadow price indication for a service or class indicating that additional value would likely be obtained by allocating an additional unit of capacity to the service or class.

18 Claims, 10 Drawing Sheets

(51) Int. Cl.
*H04L 12/917* (2013.01)
*H04L 12/927* (2013.01)

(56) References Cited

U.S. PATENT DOCUMENTS

2008/0049614 A1* 2/2008 Briscoe .............. H04L 41/0806
370/230
2011/0244839 A1* 10/2011 Poltorak .............. H04M 15/00
455/414.2

OTHER PUBLICATIONS

International Search Report for PCT/GB2011/000290, mailed Apr. 11, 2011.
Written Opinion for PCT/GB2011/000290, mailed Apr. 11, 2011.

* cited by examiner

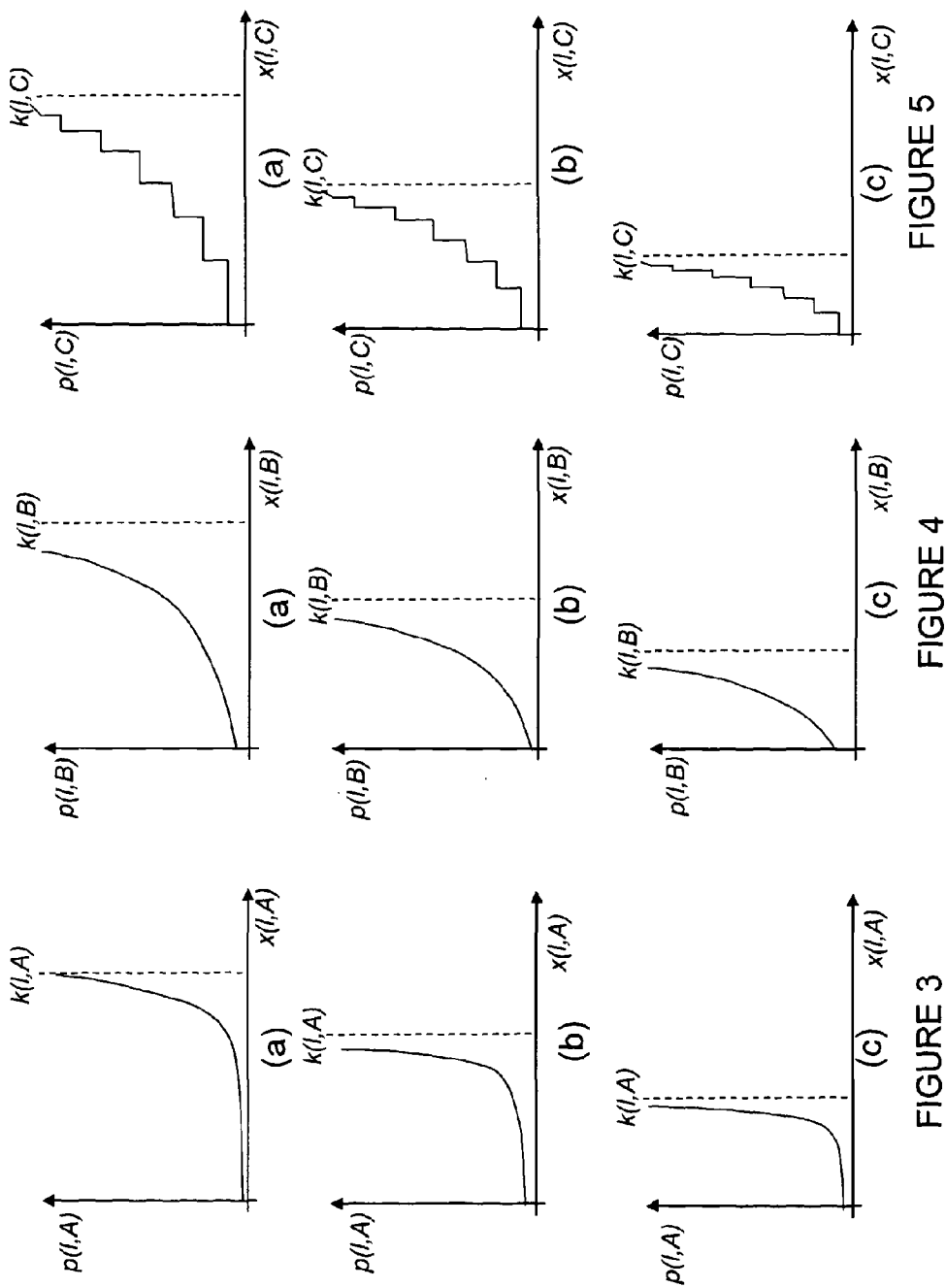

(C)
(B)
(A)

CAPACITY ADAPTATION BETWEEN SERVICES OR CLASSES IN A PACKET NETWORK

This application is the U.S. national phase of International Application No. PCT/GB2011/000290 filed 3 Mar. 2011 which designated the U.S. and claims priority to GB Patent Application No. 10250431.3 filed 9 Mar. 2010, the entire contents of each of which are hereby incorporated by reference.

TECHNICAL FIELD

The present invention relates to a method and system for adapting capacity in a packet network between multiple services, or service or traffic classes. In particular embodiments of the invention network capacity is shared between multiple services, or service or traffic classes, in dependence on respective shadow price indications for the services or classes in question.

BACKGROUND OF THE INVENTION

Packet networks such as Internet Protocol (IP) networks, multi-protocol label switched (MPLS) networks, or Ethernet networks are of increasing importance in next generation communications networks. Typically, and with reference to FIG. 1, a packet network 10 accepts traffic at an ingress gateway node 12 (or another such node 14, 16, 18, 20) from a source node outside the network 10 and destined for a destination node, via one of the other such nodes, for example, acting as an egress gateway node. A typical network comprises internal routers or switches 200, having interconnecting links 210 therebetween, over which data traffic is transmitted. Data progresses through the network on a hop by hop basis from router/switch to router/switch, as is well known in the art. A routing algorithm will be used to determine via which nodes and links in a network a data packet will progress across the network from an ingress gateway node to an egress gateway node.

A multi-service network is a network which uses the same network technology, such as IP, IP/MPLS, or Ethernet, for a variety of traffic classes. The available network capacity is shared between the different classes. A variety of systems and processes work together to ensure that contention between different service of traffic classes is dealt with appropriately and carried traffic in each individual class meets necessary requirements as captured in service level agreements relating to each class. Some of these systems and processes are defined for one particular service or traffic class. Examples are admission control systems for session-based services, and traffic engineering and bandwidth policing for VPN services. Other processes deal explicitly with the interaction between different service or traffic classes. Examples of such processes are queueing mechanisms (such as strict priority queueing or weighted fair queueing) which determine how packets belonging to different traffic classes are dealt with at each individual router or switch. Capacity planning, determining when and by how much to increase the capacity of certain network elements, can be viewed as a longer time-scale control process which affects the performance of all service classes.

Within the IETF, DiffServ, an architecture for offering differentiated services over IP networks, has been captured in RFC2475. Individual network operators can use DiffServ to guide the design of elements of their own multi-service networks.

FIG. 2 illustrates how the capacity of a link l between two network nodes 200 may be divided between multiple traffic classes. In this example the total link capacity K(l) is divided between three service or traffic classes, service A, service B, and service C. For example, each service class might relate to an individual VPN using the link. In this example, service A has allocated an amount of the capacity k(l, A), service B has allocated k(l, B), and service C has allocated k(l, c). Each service or traffic class, will typically have its own service level agreement specifying traffic characteristics and associated network transport charges. In this respect, as set out in RFC 2475, the term "service" encompasses a wide range of characteristics of packet transmission in one direction across a set of one or more paths within a network. These characteristics may be specified in quantitative or statistical terms of throughput, delay, jitter, and/or loss, or may otherwise be specified in terms of some relative priority of access to network resources. Service differentiation is desired to accommodate heterogeneous application requirements and user expectations, and to permit differentiated pricing of Internet service.

There are several existing proposals for managing traffic within a single service class in a network where the capacity allocated to that service class is already determined that make use of so called "congestion prices". Generally, congestion prices are defined for individual links and increase as the link's utilisation increases. One example of a traffic management proposal that makes use of congestion prices is the rate control scheme for elastic (best effort) traffic described in Frank Kelly, Aman Maulloo and David Tan: "*Rate control in communication networks: shadow prices, proportional fairness and stability*", Journal of the Operational Research Society 49 (1998) 237-252. In this scheme, the congestion prices of all links that are (considered to be) used by a particular flow or session are added to obtain a total cost. This total cost is used to determine how to adjust the flow rates (increase for low costs, decrease for high costs).

Another example use of congestion prices are the arrangements described in our earlier International patent applications WO09/122150 and WO09/122152. These applications describe a joint multi-path routing and admission control scheme for guaranteed, session-based services, wherein the link congestion prices are used to determine which, if any, of the available paths to use for a session (by selecting the path with lowest cost and admitting the session to that path if the cost is sufficiently low).

In terms of service or traffic class capacity determination, however, the resource control schemes discussed above assume that service or traffic class capacity has been fixed in advance at a particular level, for example by network planners. In this respect, the congestion pricing functions used require a given link capacity, and operate with the objective that flow rate or admission is controlled such that the given capacity is not exceeded—the congestion price typically approaches infinity (or a high value) at the provided capacity, such that total capacity utilisation is not usually achieved. In this respect, in the schemes discussed above, the congestion price is interpreted as a cost incurred for using a unit of the capacity allocated to the considered service class, with that cost increasing as the available capacity reduces.

In another article entitled "*Achieving optimal revenues in dynamically priced network services with QoS guarantees*" by Steven Shelford et al (Computer Network vol. 51 (2007), pages 3294-3304), the problem is considered of a single Internet Service Provider (ISP) determining the bandwidth to allocate to each of a number of dynamically priced network services, and on which path, in order to maximize revenue while guaranteeing end-to-end quality of service (QoS). No knowledge of demand functions is assumed. Optimal allocation of bandwidth to services is first considered, where services are assumed to be routed on predetermined paths. An Iterative Allocation Adjustment heuristic is defined, based on the concepts of "tatonnement" (an iterative process where prices are adjusted until supply equals demand). There is also a discussion of how to value links in the network to identify re-routing possibilities, or possible routes for new services, in order to improve the revenue of an ISP.

SUMMARY OF EXAMPLES OF THE INVENTION

Example embodiments of the invention provide a method and system that adaptively adjust the allocated capacity of a network between services, or service or traffic classes, in dependence on a congestion-influenced "shadow price indication" in respect of each service or service or traffic class. In this respect, instead of viewing and using the congestion price as a cost of using an already allocated unit of capacity, a suitably-determined shadow price indication can be viewed as an indicator of the value obtainable from allocating an extra unit of capacity to a service, or service or traffic class, and used accordingly instead. By so doing, the shadow price indication becomes a factor to be taken into account in deciding on capacity allocation between services and classes, with a high shadow price indication for a service or class indicating that additional value would be obtained by allocating an additional unit of capacity to the service or class.

A suitable "shadow price indication" for a class or service may be determined essentially in dependence on the extent to which the data traffic rate congests the capacity allocated to that class or service.

To take account of the above realisation, in the method and system of the present invention, shadow price functions are maintained for respective multiple services, or traffic or service classes, that are dependent not just on traffic rate for the services or classes, but also the allocated capacity for the services or classes. A shadow price indication is then obtained for each of the multiple services, or service or traffic classes, as a function of present traffic rate and present allocated capacity, and this is used as an input into a capacity adaptation algorithm, that calculates updated capacity allocations in dependence on the shadow price indications. Generally, a service, or service or traffic class, with a high shadow price indication relative to other services or classes should be allocated additional capacity at the expense of the other services or classes, although the overall object of the capacity adaptation algorithm is to maximise generated value. In one embodiment value is taken to be dependent on the product of the shadow price indication and present capacity allocated, and hence a service, or service or traffic class, with a small allocated capacity but high shadow price indication may in fact generate less marginal value than a higher capacity service, or service or traffic class, with a slightly lower shadow price indication, and hence receive a smaller capacity allocation than its shadow price indication alone would indicate.

In view of the above, from a first aspect the present invention provides a method of allocating network capacity between a plurality of services, or a plurality of service or traffic classes, on one or more links between nodes in a packet network, the method comprising:

a) determining respective shadow price indications for the plurality of services, or the plurality of service or traffic classes, the shadow price indications being indicative of a value obtainable from allocating an extra unit of capacity to a service, or to a service or traffic class, and being determined in dependence on respective data traffic rates and network capacity allocations of the services, or the service or traffic classes, on the one or more links;

b) calculating respective target capacity allocations for the plurality of services, or service or traffic classes, in dependence on the determined respective shadow price indications; and c) in dependence on the calculated target capacity allocations, updating the respective capacity allocations for the plurality of services, or service or traffic classes, at least partially towards the calculated target capacity allocations;

wherein the plurality of services, or service or traffic classes, are then operated with the updated network capacity allocations.

In one example embodiment, the target capacity allocations are calculated so as to increase and/or maximise value obtained from transmission of data packets in the services, or the service or traffic classes. In particular, in one example embodiment the calculating further comprises calculating respective target capacity allocations in dependence on the determined respective shadow price indications and respective existing capacity allocations. In this way, by taking into account present capacity and shadow price indication, an estimated measure of value may be obtained and used to update the capacity allocations.

In one example embodiment, the calculating comprises finding respective value measures for the respective services, or service or traffic classes, in dependence on the respective shadow price indications and the respective existing capacity allocations, and allocating a proportion of capacity to a service, or to a service or traffic class, in dependence on the ratio of its respective value measure to the sum of value measures for the plurality of services, or service or traffic classes. In this way, the respective value measures for each of the service or traffic classes competing for capacity are considered, and hence a more optimal allocation of capacity is obtained.

In one example embodiment, a respective value measure for a service, or for a service or traffic class, is the product of the respective shadow price indication and existing capacity allocation for the service, or the service or traffic class.

In one example embodiment the updating comprises altering the capacity allocation towards the target capacity allocation according to a step-size coefficient determining how far towards the target capacity allocation an existing capacity allocation is altered. Depending on the shadow price functions used for the service or traffic classes, this can help to promote more stable operation, and prevent large oscillations in capacity allocations.

In one example embodiment the shadow price indication is determined from a shadow price function that relates a shadow price indication for a service, or for a service or traffic class, to data traffic rate and capacity allocation for that service, or for that service or traffic class, the method further comprising adaptively updating the shadow price function to take into account the updated capacity allocations, and then repeating functions a) to c). In this way, capacity allocations can be repeatedly updated to take into account present traffic conditions for each service or traffic class.

From another aspect the present invention also provides a computer program or suite of computer programs, so arranged such that when executed by a computer it/they cause the computer to operate according to any of the above embodiments. Additionally, a related aspect also provides a computer readable medium storing a computer program or at least one of the suite of computer programs according to the previous aspect.

Another aspect of the invention provides a system for allocating network capacity between a plurality of services, or a plurality of service or traffic classes, on one or more links between nodes in a packet network, the system comprising:
- a) at least one shadow price indication calculator arranged to determine respective shadow price indications for the plurality of services, or the plurality of service or traffic classes, the shadow price indications being indicative of a value obtainable from allocating an extra unit of capacity to a service, or to a service or traffic class, and being determined in dependence on respective data traffic rates and network capacity allocations of the services, or the service or traffic classes, on the one or more links;
- b) at least one service capacity adaptor arranged to calculate respective target capacity allocations for the plurality of services, or service or traffic classes, in dependence on the determined respective shadow price indications; and
- c) at least one service controller arranged to update the respective capacity allocations for the plurality of services, or service or traffic classes, at least partially towards the calculated target capacity allocations, in dependence on the calculated target capacity allocations;
- wherein the plurality of services, or service or traffic classes, are then operated with the updated network capacity allocations.

In an example embodiment of this aspect, the target capacity allocations are calculated so as to increase and/or maximise value obtained from transmission of data packets in the services, or in the service or traffic classes.

In another example embodiment of this aspect, the service capacity adaptor is further arranged to calculate respective target capacity allocations in dependence on the determined respective shadow price indications and respective existing capacity allocations. The service capacity adaptor may further be arranged to find respective value measures for the respective services, or service or traffic classes, in dependence on the respective shadow price indications and the respective existing capacity allocations, and to allocate a proportion of capacity to a service, or to a service or traffic class, in dependence on the ratio of its respective value measure to the sum of value measures for the plurality of services, or service or traffic classes.

In another example embodiment of this aspect, the at least one service controller is further arranged to alter the capacity allocation towards the target capacity allocation according to a step-size coefficient determining how far towards the target capacity allocation an existing capacity allocation is altered.

A further aspect of the invention provides an apparatus, comprising:
- at least one processor; and
- at least one memory including computer program code
- the at least one memory and the computer program code configured to, with the at least one processor, cause the apparatus to perform at least the following:
- allocate network capacity between a plurality of services, or a plurality of service or traffic classes, on one or more links between nodes in a packet network, by at least:
  - a) determining respective shadow price indications for the plurality of services, or the plurality of service or traffic classes, the shadow price indications being indicative of a value obtainable from allocating an extra unit of capacity to a service, or to a service or traffic class, and being determined in dependence on respective data traffic rates and network capacity allocations of the services, or the service or traffic classes, on the one or more links;
  - b) calculating respective target capacity allocations for the plurality of services, or service or traffic classes, in dependence on the determined respective shadow price indications; and
  - c) in dependence on the calculated target capacity allocations, updating the respective capacity allocations for the plurality of services, or service or traffic classes, at least partially towards the calculated target capacity allocations;
  - wherein the plurality of services, or service or traffic classes, are then operated with the updated network capacity allocations.

Referring again to the "Shelford et al" paper, discussed earlier, and comparing it with embodiments of the invention as set out above, it will be understood that with preferred embodiments of the invention, a shadow price indication is constructed by observing traffic and comparing it to capacity, and is used to adjust capacity allocations. While the shadow price indication is influenced by congestion (i.e. it becomes high as a link becomes congested), it is not in fact a "congestion price", or a "real" price at all, in the sense that it is not generally intended to be charged to anyone. In order to avoid any possible confusion, it is therefore not referred to as a "congestion price" in this specification—the term "shadow price indication" is used instead. The system proposed by "Shelford et al", by contrast, does start from "real" prices (i.e. prices as charged to customers) and adjusts allocations to maximise revenue based thereon.

BRIEF DESCRIPTION OF THE DRAWINGS

Further features and advantages of embodiments of the present invention will become apparent from the following description thereof, presented by way of example only, and by reference to the accompanying drawings, wherein like reference numerals refer to like parts, and wherein:

FIGS. 3, 4 and 5 illustrate example shadow price functions that may be used in an embodiment of the invention;

DESCRIPTION OF THE EMBODIMENTS

Figure 1:
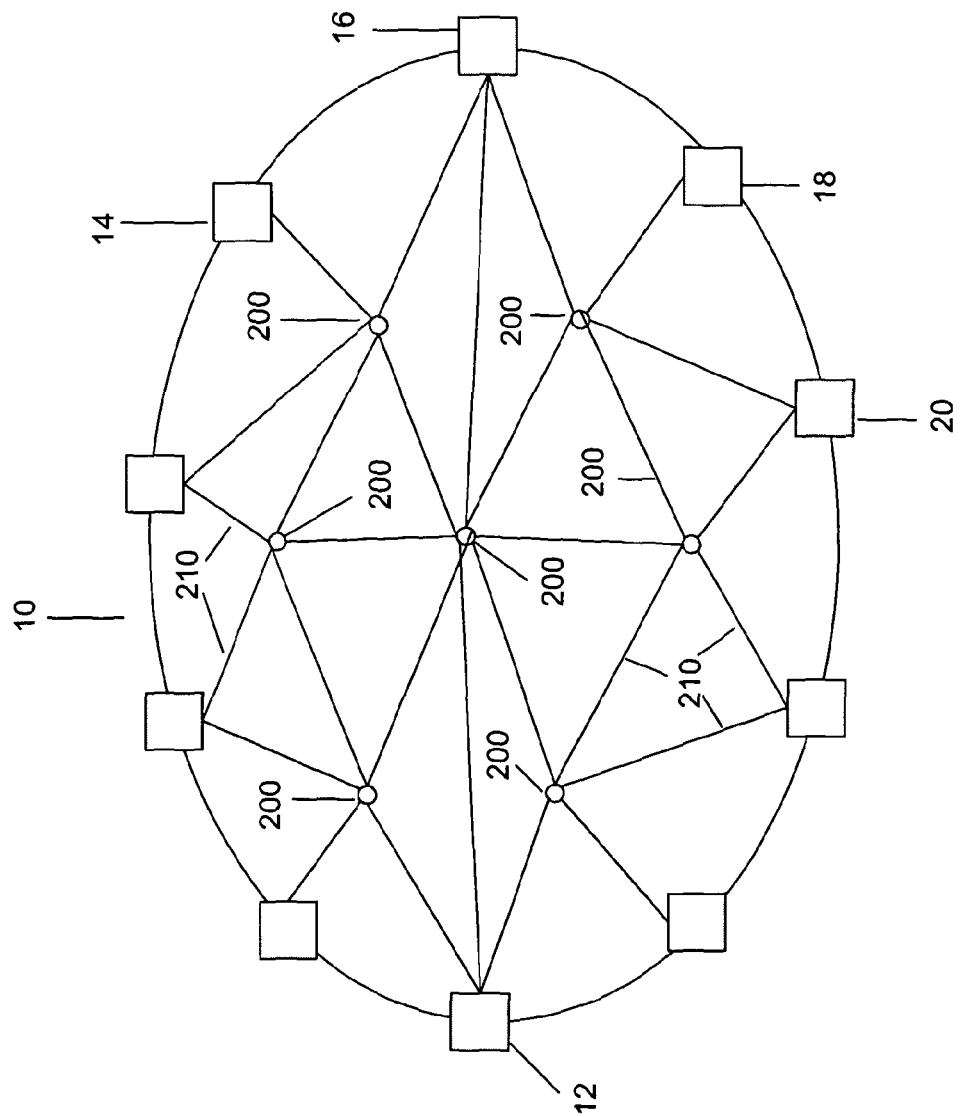
FIG. 1 is a diagram illustrating a typical packet network topology.
Figure 2:
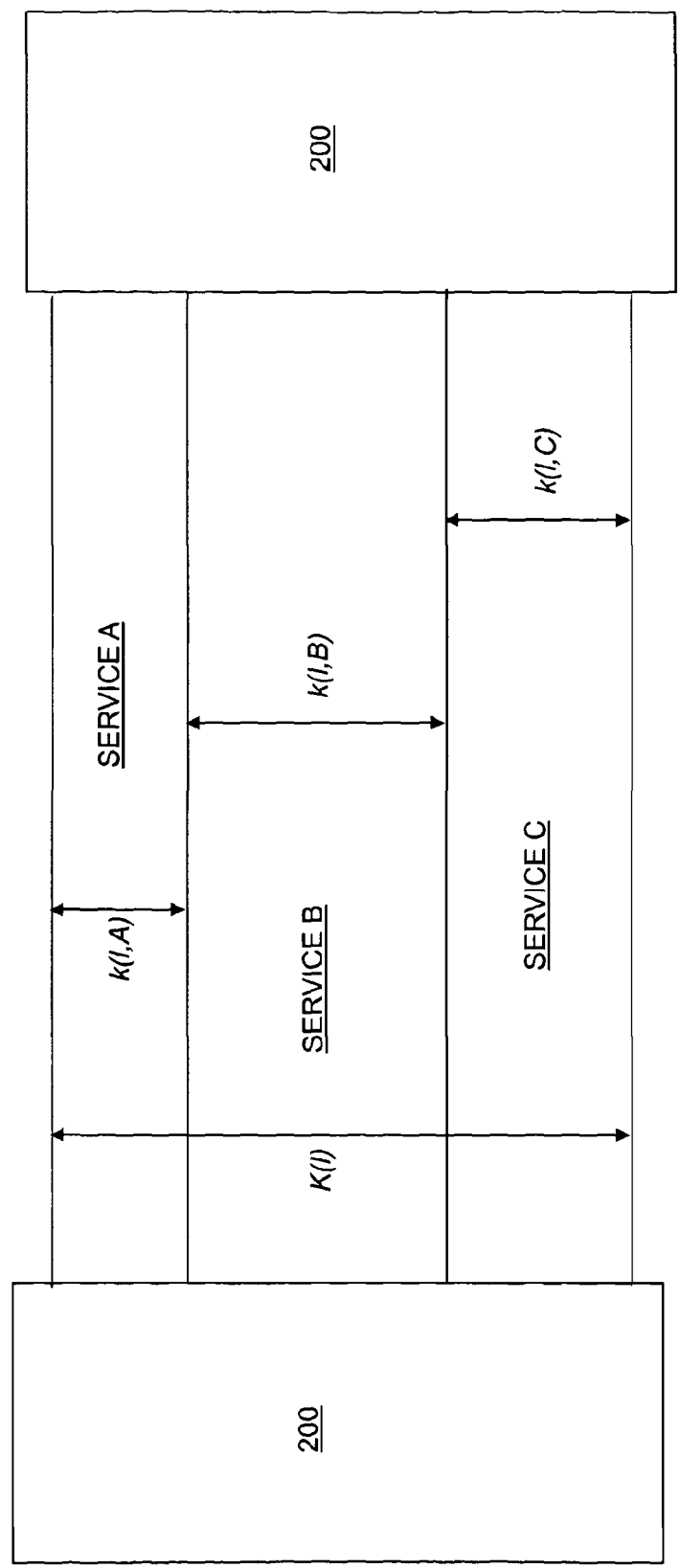
FIG. 2 is a diagram illustrating how the capacity of a link between two network nodes can be split across several services.

A brief overview of embodiments of the invention will be described next, followed by detailed descriptions of embodiments.

Embodiments of the present invention are directed at allocating network capacity between multiple services, or service or traffic classes, using congestion-influenced "shadow price indications" for the services or classes. In this respect, in previous work congestion prices were interpreted as the cost of using an additional unit of already-allocated capacity. However, in embodiments of the present invention, instead of interpreting congestion prices in this way, and using them as explained earlier, we use a "shadow price indication", using this to represent the value that could be obtained if an extra unit of capacity were allocated to the service or class to which it relates. By using the alternative interpretation and understanding of what is represented by a congestion price, then using such "shadow price indications" instead of just using the congestion prices to control the traffic within each of the services or classes, it becomes possible to use them additionally or alternatively to adjust the allocations of individual link capacities to different services, or service or traffic classes.

As an example, consider a link (labelled l) which supports three service classes, A, B, and C, where the typical value of traffic of class A is higher than that of class B, which in itself has higher value than class C traffic. Now suppose that the demand for class A traffic is much lower than the available capacity (on link l). The corresponding shadow price indication $p(l,A)$ will be driven to almost 0. Also suppose that the demand for traffic of classes B and C is so high that the current capacity allocated to these service classes on link l is not sufficient to support all demand. The control mechanisms for classes B and C will drive the shadow price indications $p(l,B)$ and $p(l,C)$ to levels that are high enough to ensure that the actual rate at which traffic is offered to link l stays below the capacities $k(l,B)$ and $k(l,C)$ allocated to classes B and C, respectively, on link l. Because class B has a higher typical value than class C, we will find $p(l,B)$ to be higher than $p(l,C)$ which in turn will be higher than $p(l,A)$ (because although the typical value of traffic if class A is higher than classes B or C, because class A is not at all congested the shadow price indication for class A is very low). This suggests that class B should get more of the capacity of link l, whereas class A could relinquish a bit of the capacity allocated to it self. Using these so-called "shadow price indications", derived not just as a function of present traffic rate but also as function of present allocated capacity, it becomes possible to define a wide range of capacity adjustment rules which will drive the network as a whole towards allocations of capacities to services or classes that allow for maximal value generation. For example, depending on the precise arrangement of the capacity adjustment rules used, in the example considered here, a bit more capacity may also be given to class C on link l, whilst other adjustment rules will leave this allocation unchanged and others may even move some of the capacity previously allocated to class C to class B.

Such operation is generally, in some example embodiments, obtained as follows. For each link I in the network, we maintain state variables $k(l,S)$, representing the amount of capacity allocated to service class S on that link. These state variables can be stored on the associated router/switch or possibly in a centralised management system.

Each service class S maintains a shadow price indication $p(l,S)$ for each link I in the network. This shadow price indication increases as the rate $x(l,S)$ of traffic of class S on link l increases. Moreover, it decreases as the capacity $k(l,S)$ increases. For example, in one embodiment we could measure the rate $x(l,S)$ over a certain time period and set $p(l,S)=a/(k(l,S)-x(l,S))$. In other embodiments, different shadow price functions may be used. Generally, however, a shadow price function will result in a low price when there is ample capacity for a service class on a link, and a high price when the service class is approaching the allocated capacity. Further examples of shadow price functions will be described later.

Moreover, we assume that each service class uses its shadow price indications to control the traffic within that service class in a natural manner, i.e., higher prices trigger traffic reduction mechanisms. For the example price function above, we would see the shadow price indication increase steeply as the rate $x(l,S)$ approaches the capacity $k(l,S)$ allocated to class S on link l.

By maintaining such shadow price indications for each service class on a link, it then becomes possible, at regular intervals, to update the capacity allocations $k(l,S)$ using for example either the most recently observed values of $p(l,S)$ or some (moving) average value of $p(l,S)$ as observed over a certain time period. A wide variety of possible update rules which increase (decrease) the capacity allocated to classes S for which $p(l,S)$ is high (low) while ensuring that the total allocation (over all service classes) remains constant can be used, and examples of such will be described later.

Generally, therefore, in some embodiments of the invention shadow price indications are maintained for traffic or service classes that are a function of both traffic rate in the class as well as allocated capacity for the class. By then determining relative shadow price indications derived from such functions for multiple service classes, it becomes possible to adapt the capacity allocated to each service class so as to maximise the value of traffic in the network.

Before proceeding further, it will be useful to include a note on terminology. Herein we refer to "service or traffic classes", being groups of one or more data streams that are intended to be sent with the same or substantially the same service i.e. quality of service (QoS) attributes. Hence, a data stream belonging to a first service or traffic class should have the same or similar parameters such as latency, jitter, throughput, loss, etc. as another data stream in the same class. However, the parameters of these data streams belonging to the first service or traffic class are typically different to the parameters of data streams belonging to a second service or traffic class, which would provide a service with different statistical parameters.

In addition, it should also be considered that a single service or traffic class may relate to a data stream (or streams) belonging to a particular end-user service, that is a service provided to an end-user, such as for example a video-on-demand service, or a voice telephony service. That is, traffic from such an end-user service is dealt with as its own particular traffic or service. In such a case, reference to a service also refers to the associated service or traffic class to which traffic from the end-user service belongs.

In view of the above, herein we have often used the terms service class or traffic class, and service distinctly, but for the purposes of the present description they can also be used interchangeably as alternatives, with each providing a different embodiment.

In view of the above operational overview, a more detailed description of specific embodiments of the invention will now be undertaken with respect to the drawings.

A first example embodiment of the invention is performed at a network node 200, and in particular is arranged to adapt the capacity of a link from the network node 200 for use by multiple services, or service or traffic classes. In particular, the capacity of the link is to be shared between multiple services or classes, in this example Service (Class) A, Service (Class) B and Service (Class) C. Each of the services or classes is to be allocated a particular share of the link capacity, with that share being adapted in dependence on the shadow price indication obtained for each service or class, which in this embodiment is itself dependent on the present traffic rate for each service or class, and present allocated capacity for each service or class.

For the sake of brevity and readability, in the following we shall refer simply to "services" e.g. Service A, Service B, etc. However, it should be understood that by a "service" we also mean as alternatives a service or traffic class, or an end-user service the traffic relating to which has its own QoS parameters (and hence effectively forms its own service or traffic class).

Figure 6:
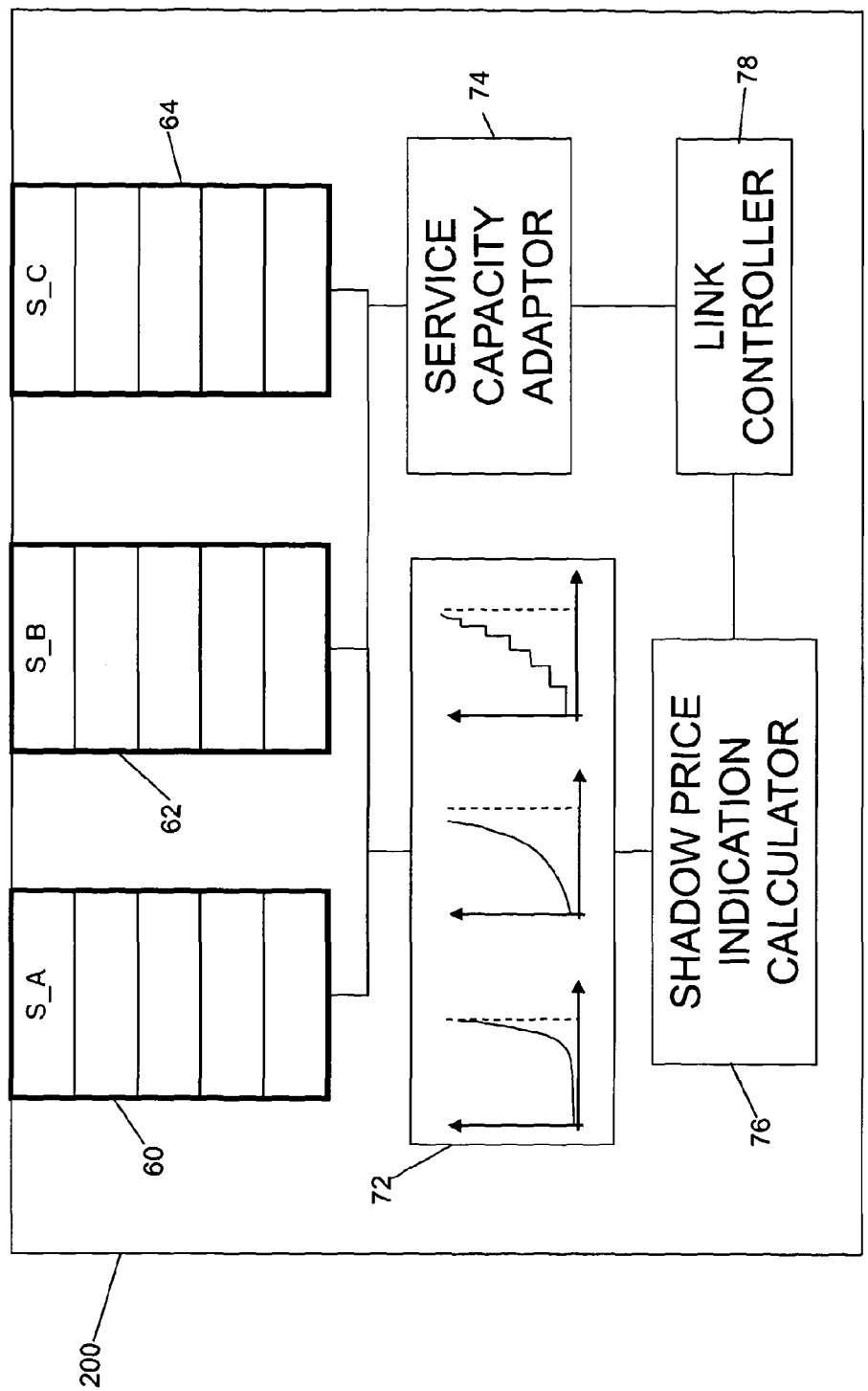
FIG. 6 is a block diagram of an example network node in an embodiment of the invention.

FIG. 6 therefore illustrates a network node 200, which has traffic buffers, 60, 62 and 64 for storing traffic packets relating to each of the services (or, for the last time, service classes) A, B and C, respectively. That is, packets belonging to Service A are queued in buffer 60, whereas the packets belonging to Service B are queued in buffer 62 and the packets belonging to Service C are queued in buffer 64. A traffic gatekeeper algorithm running on the link controller 78 controls the rate at which packets are released from the respective buffers 60, 62 and 64, so as to keep each service within its respective allocated capacities, and in accordance with the quality of service (QoS) requirements for each service.

In accordance with the first example embodiment also provided in the link node 200 is shadow price function data 72, relating to shadow price functions for each of the Services A, B and C. As discussed, for each service a shadow price function is maintained that allows the computation of shadow price indication in dependence on present allocated capacity k(l, S) to a service S, as well as present actual traffic rate for that service x(l, S). FIGS. 3, 4 and 5 illustrate example shadow price functions, and how the shadow price functions may change as the capacity allocated to a particular service is altered. For example, FIG. 3 illustrates the shadow price function for service A, with FIG. 3a illustrating the shadow price function which relates price to rate for a large capacity allocation k(l,A) whereas FIG. 3b illustrates the shadow price function relating shadow price indication to traffic rate for a medium sized traffic allocation k(l,A). Similarly, FIG. 3c illustrates the shadow price function relating price to traffic rate for a small traffic allocation k(l,A). It should be understood that in one example embodiment, the shadow price function relating price to traffic rate is scalable in dependence upon the allocated capacity. That is, for a smaller allocated capacity the shadow price function will generally have a higher gradient of price to rate i.e. for a smaller allocated capacity a lower rate will lead to a higher shadow price indication than the same rate where the service has been allocated a larger capacity—this is shown in FIGS. 3(a)-(c), but is also apparent from FIGS. 4 and 5.

FIG. 4 illustrates an example shadow price function for service B. Here, again FIG. 4a relates to the shadow price function where Service B has been allocated a large amount of capacity. FIG. 4b relates to the shadow price function where Service B has a medium amount of capacity and FIG. 4C illustrates the shadow price function where Service B has a relatively small amount of allocated capacity. Again it will be seen that the shadow price indication is scalable in dependence on capacity, and becomes compressed leading to higher gradients when a lower amount of capacity is allocated. That is, generally, for a given shadow price indication, the gradient of the shadow price indication curve relating price to traffic rate is greater for a lower allocated capacity.

FIG. 5 illustrates a third form of shadow price function, in this example used by Service C. Again, FIG. 5a relates to the case where Service C has a relatively large amount of allocated capacity, FIG. 5b to the case where Service C has a medium amount of allocated capacity and FIG. 5c to the case where Service C has a relatively small amount of allocated capacity. The shadow price function for Service C increases in discrete steps, but the difference in traffic rate required for a step increase (or decrease) differs in dependence on the allocated capacity. When Service C has a relatively large amount of allocated capacity, a larger difference in traffic rate of Service C is tolerated before there is a step change in shadow price indication. At the other end of the scale where there is a small amount of allocated capacity to Service C, then smaller changes in traffic rate for Service C are tolerated before there is a step change in shadow price indication. As will be apparent from FIGS. 5a to 5c, therefore, the stepwise shadow price function for Service C is scalable with respect to traffic rate, in dependence on allocated capacity to Service C.

The shadow price function data store 72 stores sufficient data for the shadow price indications for each of the services to be calculated for any traffic rate and capacity allocation that may be encountered. In this respect, the shadow price functions may be stored as one or more mathematical functions, as look-up tables of pre-calculated data, or as combinations of either.

Returning to FIG. 6, the shadow price function data for each of the services supported by the link 200 is stored in the shadow price function store 72, for example in the form of mathematical functions, or as lookup tables, as mentioned. This data is accessible by a congestion cost calculator 76, which acts to interpret the shadow price function data 72 to return, for each service, an instant shadow price indication, or, in some embodiments, a time averaged shadow price indication, to a link controller 78. The link controller 78 then uses the instant shadow price indications, or where used, the time averaged shadow price indications, as an input to the service capacity adaptor 70. The service capacity adaptor 70 then computes target service capacity allocations, in dependence on the shadow price indications for each service passed to it by the link controller 78, as well as the present traffic rates for each service, obtainable by monitoring the rate of emptying of each of the buffers, 60, 62 and 64. The service capacity adaptor 74 then calculates target service capacity allocations, and, in some embodiments, actual service capacity allocations in dependence upon the target allocations, and then updates the rate control algorithm for each service with the new allocated service capacities.

In terms of how regularly these service capacities are updated, we envisage that the update time should be meaningful with respect to the lifetime of a packet. For example, service capacity allocation updates could occur on a period of every few hours down to every few minutes, or seconds, depending on the computational resources available. Therefore, the operations of the congestion cost calculator 76 to determine the present shadow price indication, and the service capacity adaptor 74 to calculate new service capacity allocations and control the respective service rate control algorithms are repeated intermittently.

We turn now to the procedure used in the present example embodiment for computing new target capacity allocations for the multiple services.

To recap, for each link l, we maintain capacities k(l,S) allocated to each service class S. We also observe values of the (in some embodiments average) shadow price indications p(l,S), obtained from the congestion cost calculator 76. From the perspective of the capacity allocation process performed by the service capacity adaptor 74, these shadow price indications are interpreted as the amount of extra value that would be obtained within a service class if we were to increase the capacity allocated on link l to that class by one unit.

Suppose we knew the value $v_s^l(k)$ obtained within each service class S for any capacity k allocated on link l to that service class. Then we would be able to find the capacity allocations k(l,S) which yield the highest possible value, by solving the following optimisation problem:

$$\max_{k(l,S)\geq 0} \sum_S v_s^l(k(l,S)) \quad (1)$$

$$\text{s.t.} \sum_S k(l,S) = K(l)$$

where K(l) is the total capacity of link l.

Unfortunately, we don't know the value functions $v_s^l(k)$. In the present embodiment we therefore use instead, at each link, and for each service class, an estimated (or model) value function which we denote by $w_s^l(k)$, which in this embodiment is of the form $w_s^l(k)=\alpha(l,S) \log k$. The parameter $\alpha(l,S)$ is then chosen in such a way that the marginal value (at k=k(l,S), the current allocated capacity) is equal to the observed shadow price indication p(l,S) for class S. This is true when $$\frac{dw_s^l(k(l,S))}{d(k)} = \frac{\alpha(l,S)}{k(l,S)} = p(l,S) \quad (2)$$

which implies $\alpha(l,S)=p(l,S)\cdot k(l,S)$.

The optimal solution of problem (1) is easy to find if the value functions are of this logarithmic form. In fact, in this embodiment, with value functions of this form, each class S should be allocated a fraction of the total capacity which is proportional to the value of $\alpha(l,S)$.

With the above in the present embodiment the capacity update rule becomes as follows:

1. For each service class S, compute:

$$\alpha(l,S)=p(l,S)\cdot k(l,S) \quad (3)$$

2. For each service class S compute target capacity allocations:

$$k^T(l,S) = \frac{\alpha(l,S)}{\sum_S \alpha(l,S)} K(l) \quad (4)$$

(optional) Compute new allocations $$k'(l,S)=(1,-\beta)k(l,S)+\beta k^T(l,S) \quad (5).$$

Here, $\beta \in (0,1]$ is a step size parameter: if $\beta=1$, the allocations are updated to equal the target capacities in one step. This operation (3) is optional as it need not be performed—instead the target capacity allocations used directly from (2) above may be used. However, with some networks and services, and dependent on the service shadow price functions, it may be beneficial to adjust only part-way towards the calculated optimal target allocations in order to prevent large oscillations in service capacity allocations.

Figure 7:
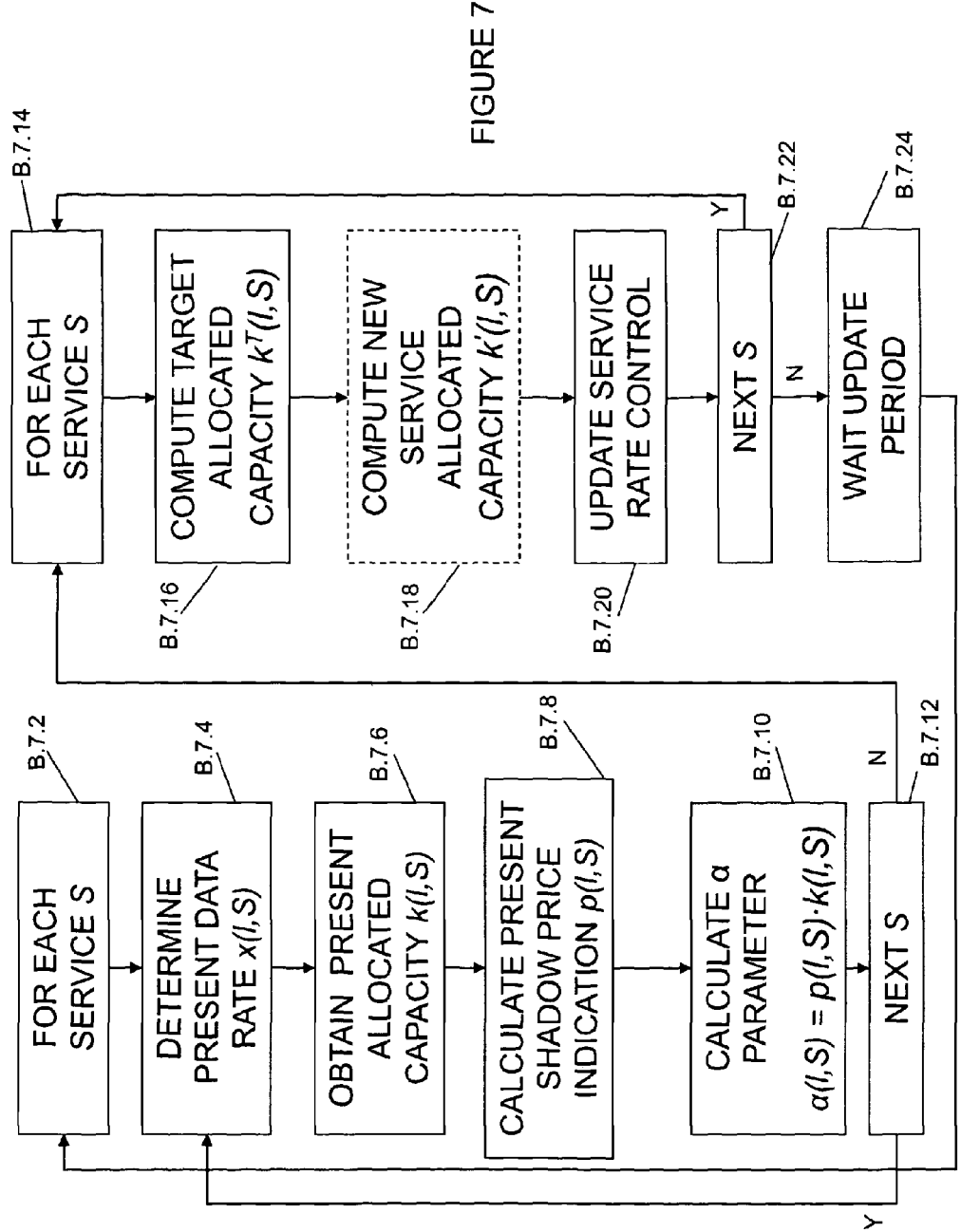
FIG. 7 is a flow diagram illustrating the operation of a service capacity adaptor in an embodiment of the invention.

FIG. 7 illustrates the above-described operation in flow diagram format. More particularly FIG. 7 illustrates the operations of the congestion cost calculator 76 and the service capacity adaptor 74 in the node 200 in calculating new service capacity allocations.

Firstly, at block 7.2 a FOR processing loop is started, in order to process each service S which makes use of an outgoing link from the node 200, and for which the service capacity adaptor 74 is to calculate the capacity allocation. Within the processing loop, firstly, at block 7.4 the present data rate x(l,S) is determined at block 7.4 as well as, at block 7.6, the present allocated capacity k(l, S) for the present service S being processed. Next, at block 7.8, using the shadow price function data 72 for the service in question, the congestion cost calculator 76 calculates the present shadow price indication p(l, S) in dependence on the present allocated capacity k(l, S) and present data rate of the service x(l, S). Having found the shadow price indication, the shadow price indication data is then passed via the link controller 78 to the service capacity adaptor 74, which then calculates the alpha parameter $\alpha(l, S)$ which is equal to the product of the calculated shadow price indication, and the present allocated capacity. This is calculated at block 7.10, and stored for later use.

At block 7.12 the processing loop started at block 7.2 evaluates whether each service has been processed in this way, and if not, the next service is selected, and processing returns to block 7.4. Otherwise, once the present shadow price indication p(l,S) and the present alpha value a(l, S) has been found for each service, processing proceeds to block 7.14.

At this moment in time, therefore, the service capacity adaptor 74 has at its disposal the present shadow price indication p(l,S), and the alpha value a(l, S) for each service S which makes use of a link l from the node 200. The service capacity adaptor 74 then starts a further FOR processing loop at block 7.14 so as to process each service in turn. For the present service being processed, at block 7.16 a target capacity allocation $k^T$ (l,S) is allocated, using equation 4 noted previously. This target allocated capacity could be used directly at block 7.20 to update the service rate control algorithm for the service presently being processed, but in some embodiments an intermediate service capacity allocation is computed, at block 7.18, using equation 5 noted previously. In this respect, with some shadow price functions, in order to prevent oscillations in capacity allocations it is beneficial to compute a new intermediate allocation between the present allocation and the target allocation, in dependence on a step size parameter β. This can prevent large oscillations in service capacity allocations and help maintain stable network operations.

Whether the computed target allocated capacity, or the computed intermediate allocated capacity is to be used for the present service, at block 7.20 the service rate control algorithm is updated with the appropriate allocated capacity being used. This has the effect of allocating more of the link capacity to the particular service, such that the sending rate of traffic belonging to the service of the link can be increased or decreased as appropriate to the allocated capacity, and the then prevailing shadow price function. After updating the service rate control algorithm for the present service being processed, an evaluation is performed at block 7.22 as to whether all services have been processed in this way, and new capacity allocations made for each service. If there is another service to be processed, then that service is selected and processing returns to block 7.16 to calculate a target allocated capacity for that service. Otherwise, once all services have had new capacity allocations made, block 7.22 returns a negative, and processing proceeds to a waiting period at block 7.24.

At block 7.24 the algorithm waits a pre-determined period, which may be in the range of a few seconds to a few hours or even days. Once the update period has expired, then the process begins again at block 7.2 so as to update the service capacity allocation to take account of present conditions at that time.

To illustrate the operation of an embodiment of the invention in more detail, FIGS. 8-16 give examples of how the capacity allocations can change, as well as how the shadow price functions alter when a capacity allocation change is made.

Figure 8:
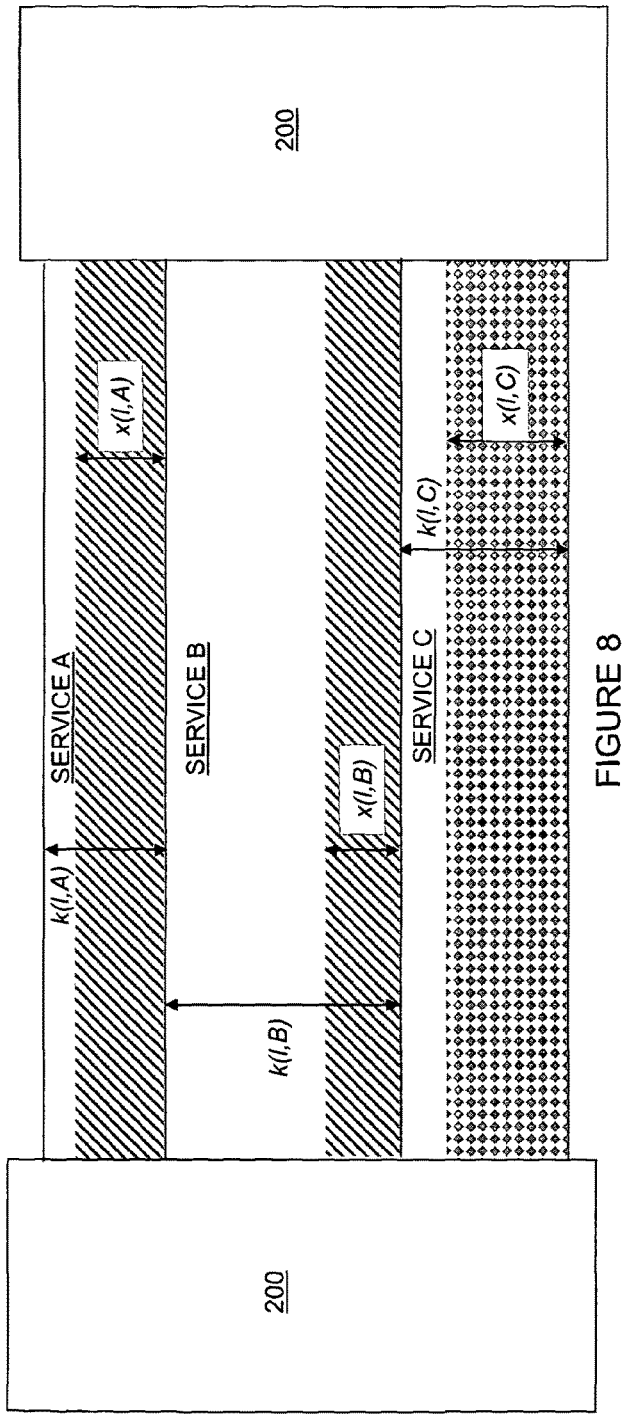
FIG. 8 is a diagram illustrating example capacity allocations in an example of the invention.

Starting with FIG. 8, here we have link between two nodes 200, and where the capacity of the link l is shared between Service A, Service B and Service C. The respective allocated capacities for each of the services are shown diagrammatically, corresponding to the widths of each band relating to each service. In addition, the present traffic rate for each service is also shown occupying a proportion of the band allocated to each service, and indicated in cross-hatch for each service.

Figure 9:
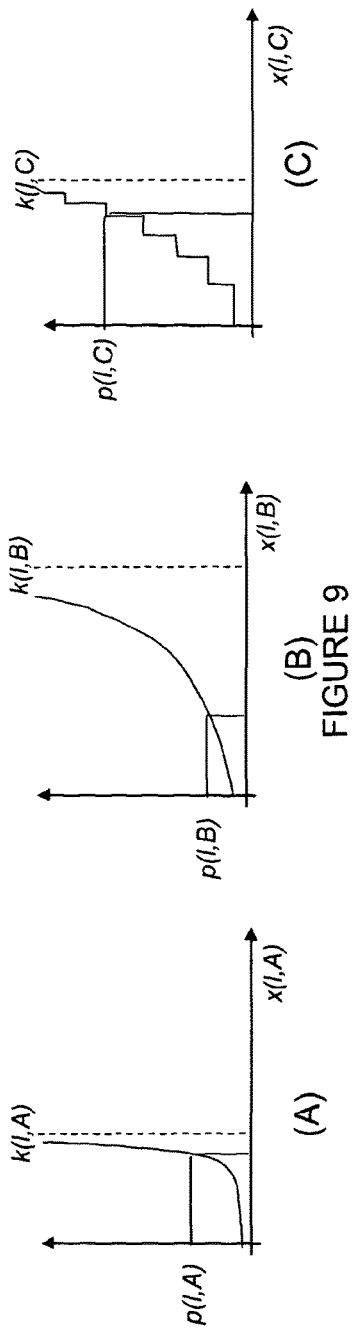
FIGS. 9($a$) to ($c$) are graphs of example shadow price functions in an example of the invention.

Given the present link conditions i.e. the service capacity allocations and service traffic rates shown in FIG. 8, FIG. 9 illustrates the respective prevailing shadow price functions for each of Service A, B and C. It will be seen that Service A has a smaller capacity allocation than Service B and Service C, and this is reflected in the shadow price function for Service A, which rises steeply such that a relatively high shadow price indication is obtained at relatively low traffic rates. Conversely, Service B has a relatively high capacity allocation, and although whilst the shadow price function for Service B is a different shape from Service A such that at low traffic rates a higher shadow price indication might be obtained for service B than from the shadow price function of Service A, for higher traffic rates a significantly lower shadow price indication will be obtained. Service C has a traffic allocation between Service A and Service B, and this is reflected in the scaling of its shadow price function.

However, with regards to present traffic rates for each service, it will be seen that Service B is operating at a relatively low capacity, and hence the shadow price indication for Service B is not that high. For Service A, while Service A is operating at a greater percentage capacity than Service B, because of the shape of the shadow price function, the shadow price indication for Service A is not that much higher than for Service B. However, for Service C, whilst it is operating in percentage terms at about the same capacity as Service A for its given allocation, the shadow price function for Service C means that the shadow price indication for Service C is much higher than for both Service A and Service B. Hence, when computing target allocations at the time when the service capacity allocations are updated, the service capacity adaptor will allocate more of the link capacity to Service C. In this respect, as described previously, the value α(l, S) is found for each service, which is the product of present allocated capacity and shadow price indication. Whilst taking into account present allocated capacity prevents a service which has a presently large allocation from losing all of its allocation (unless its shadow price indication is relatively very low), in the present case the shadow price indication of Service C is so much more than for Service A or B, that its value α(l, S) is the highest, and hence it will gain a greater share of the available capacity.

Figure 10:
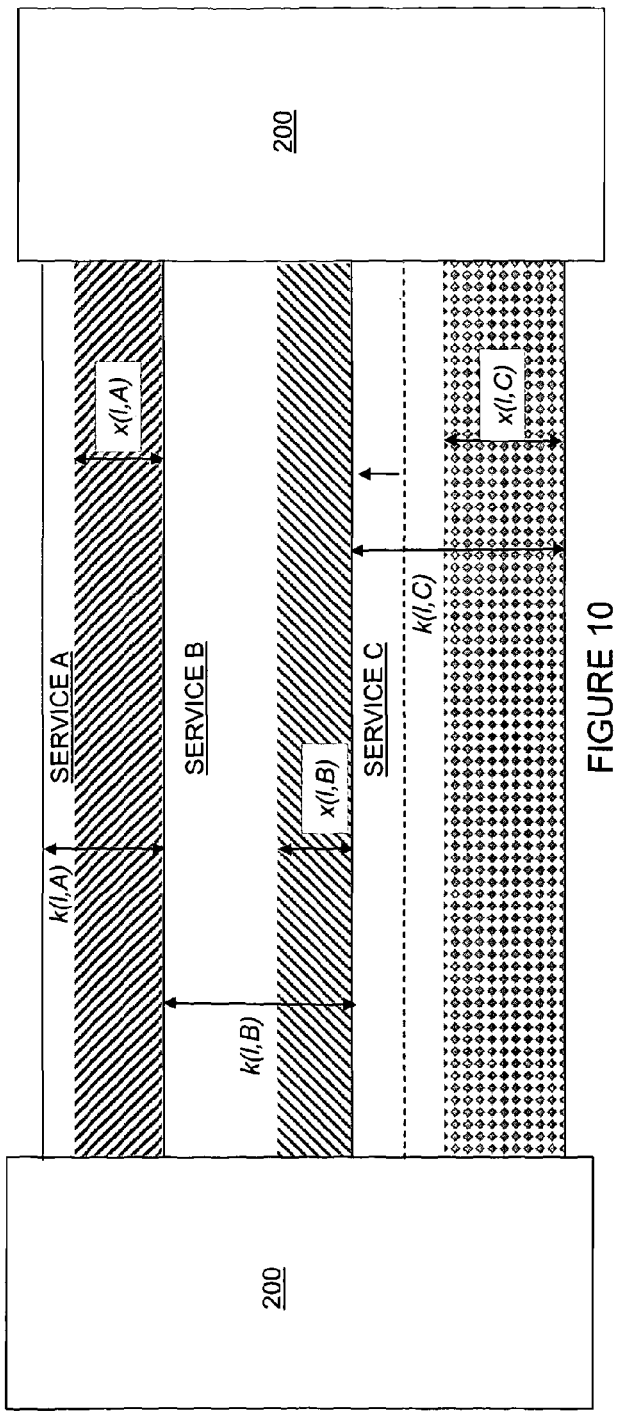
FIG. 10 is a diagram of example capacity allocations in an embodiment of the invention.

FIG. 10 illustrates the position after the service capacity adjustment has been made. Here, it will be seen that the capacity allocation for Service C has increased, at the expense of Service B. However, the present traffic sending rates for each service remain unchanged. In this example, for the sake of clarity, the service capacity allocated to Service C is at the expense of Service B, which has the lowest shadow price indication of the three services. In other embodiments, it may be that some additional capacity is granted to Service C also from Service A—this will depend on the relative marginal values of Services A and B.

Figure 11:
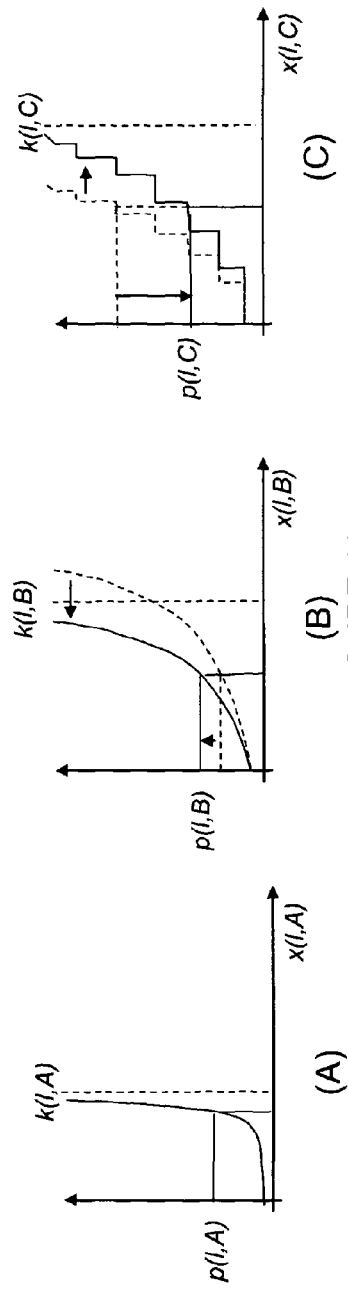
FIGS. 11(a) to (c) are graphs of example shadow price functions used in an embodiment of the invention.

FIG. 11 illustrates the change in shadow price functions for the services given the change in the capacity allocation shown in FIG. 10. FIG. 11a shows that the shadow price function for Service A remains unchanged, as does the shadow price indication calculated for Service A, as its traffic rate remains the same as previously.

For Service B, FIG. 11b shows that the shadow price function has compressed, so as to obtain a steeper gradient as the capacity of Service B has been reduced. This has the effect that, for the same traffic sending rate for Service B, the shadow price indication is increased, as shown.

For Service C, FIG. 11c shows that the shadow price function has expanded for Service C, such that greater rate changes occur between step changes in shadow price indication for Service C. As shown, this has had the effect of substantially reducing the shadow price indication for Service C. As will be seen, whilst there are small differences in resulting shadow price indication at the capacity allocation shown in FIG. 10, each of the shadow price indications for Service A, Service B and Service C are generally about the same level. In addition, the capacity allocations are also generally balanced. With this allocation, therefore, the capacity allocations may be approaching optimum for maximum value generation.

Figure 13:
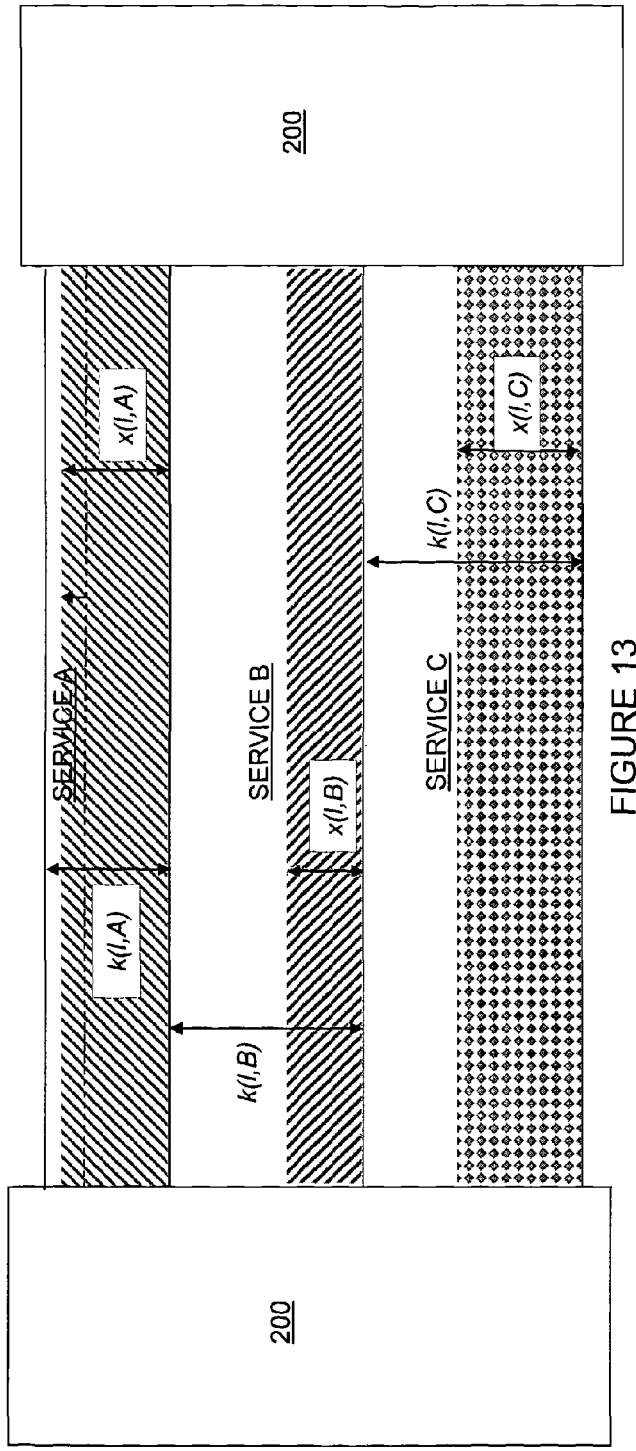
FIG. 13 is a diagram illustrating an example capacity allocation in an embodiment of the invention.
Figure 14:
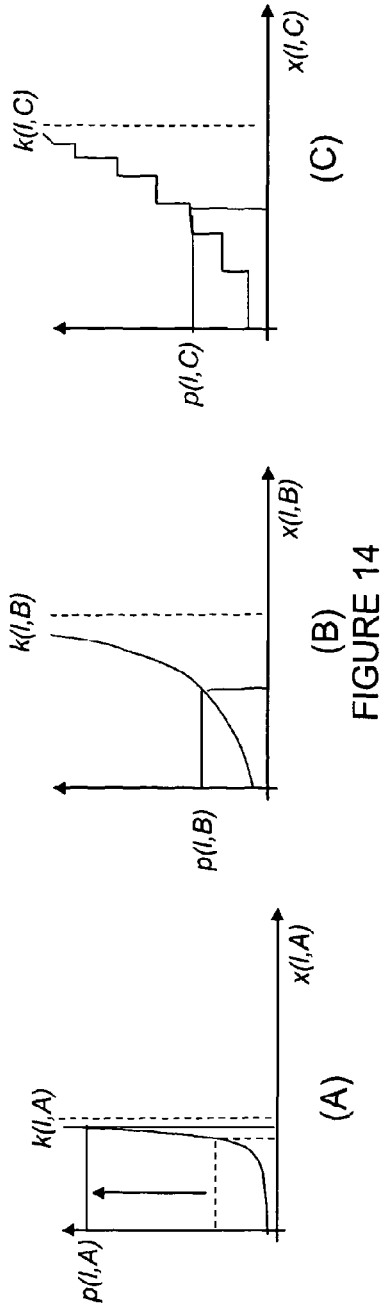
FIGS. 14(a) to (c) are graphs of example shadow price functions in an embodiment of the invention.

Turning now to FIG. 13, this illustrates a change compared to FIG. 10, in the form of an increase of traffic rate for Service A, as shown. That is, x(l,A) has increased. FIG. 14 shows the prevailing shadow price functions for FIG. 11. However, from FIG. 14a it can be seen that the increase of traffic rate for Service A has led to a large increase in the shadow price indication for Service A. However, the shadow price indication for Services B and C remains as before.

In view of this situation, when the next update is performed, the alpha value α(l, A) for Service A will be considerably higher than that for Services B and C, due to its much greater shadow price indication. Therefore, Service A will be allocated a greater share of the link capacity.

Moreover, because Services B and C have roughly the same shadow price indication, and roughly the same allocated capacity, then Service A will be allocated extra capacity from both Service B and Service C. That is, the capacities of both Service B and Service C will be reduced, with the freed up capacity from both services being granted to Service A.

Figure 15:
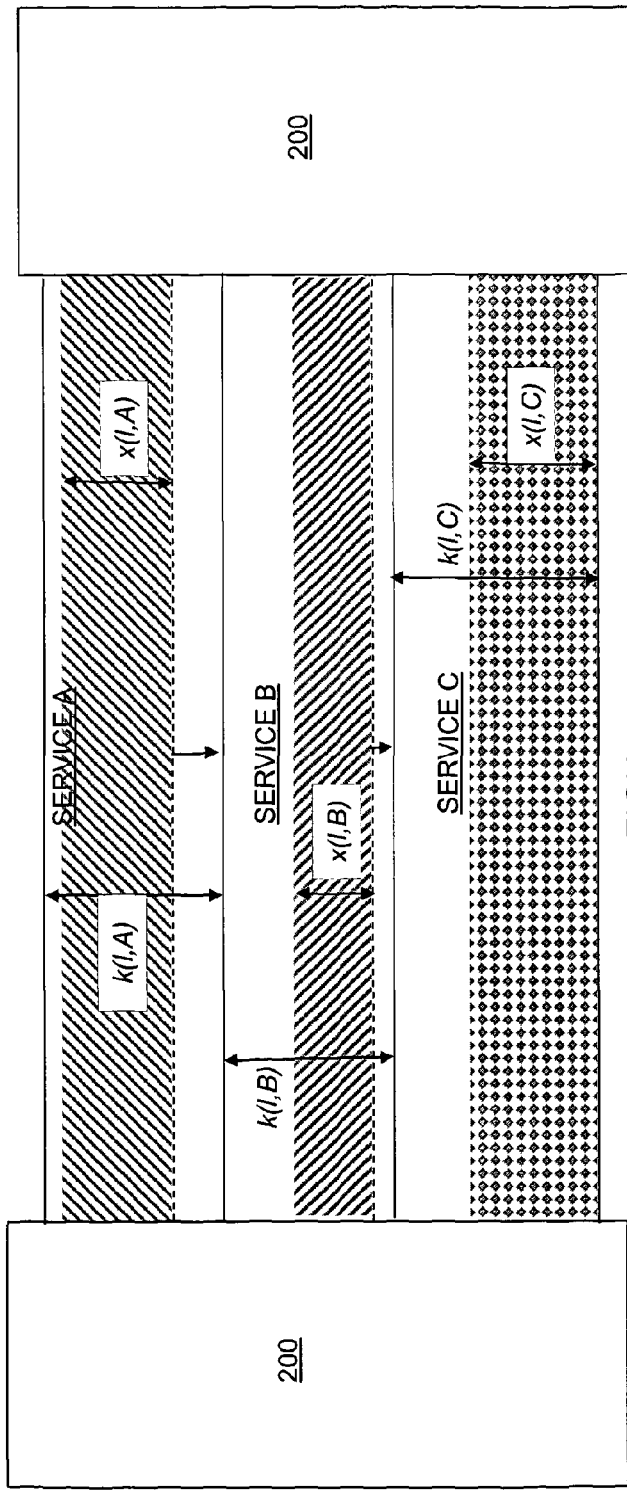
FIG. 15 is a diagram illustrating example capacity allocations in an embodiment of the invention.

The granting of the additional capacity to Service A is shown in FIG. 15. Here it will be seen that Service A is granted much more capacity, at the expense of Service B and Service C. In FIG. 15 the transmission rates for each service remain as in FIG. 13.

Figure 16:
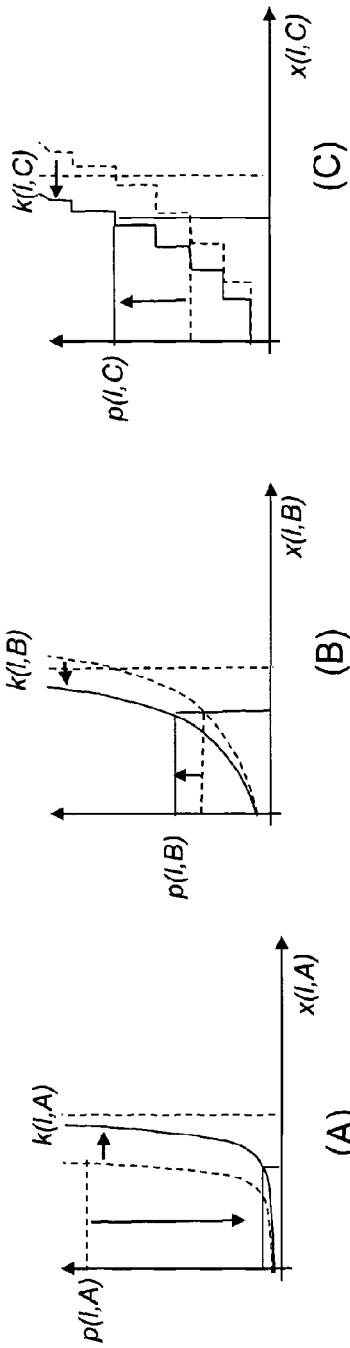
FIGS. 16(a) to (c) are graphs of example shadow price functions in an embodiment of the invention.

FIG. 16 shows the effect on the shadow price functions of these changes in allocated capacity. For Service A, because Service A has been allocated extra capacity the shadow price function expands, which has the effect of substantially bringing down the shadow price indication for Service A. Because the capacity of Service B has been reduced the shadow price function compresses, and attains a sharper gradient with respect to transmission rate. Therefore, at the same transmission rate, the shadow price indication for Service B is increased.

Similarly, for Service C, as shown in FIG. 16c, the shadow price function is compressed such that, for the same transmission rate, a greater shadow price indication is obtained. Hence the shadow price indication for Service C has increased. However, it will be seen that due to the different shadow price functions for Services B and C, the increase in shadow price indication for the two services is not the same, and the shadow price indication for Service C has increased much more than for Service B. This would mean that it will be likely on the next iteration of capacity updates that Service C would be granted additional capacity, likely at the expense of Service A.

Thus, with these examples it can be seen that as service traffic rates change and a higher shadow price indication is obtained for a service, that the service link capacity allocation can be increased. However the service link capacity allocation itself leads to changes in the shadow price function for the service, and for other services which have given up capacity, and which may lead to further changes in capacity allocations, toward an optimal allocation for present traffic rates. Over several iterations, a substantially optimal capacity allocation may be obtained, in which value is substantially maximal.

Whilst in the above described example embodiment we have used the example of three services, it should be understood that this is purely be way of example and that the concept of the embodiments of the present invention may be implied to share link capacity between any number of services on the link. In addition, we have provided several examples of shadow price functions that may be applied. It should be understood that in other embodiments different shaped shadow price functions may be used. For example, each service may have substantially the same shape shadow price function, or may have different shape shadow price functions as in the above example. Where services have a shadow price function which is substantially the same shape, it may be easier for the optimisation algorithm to converge on an optimal solution, with fewer iterations.

In addition, as discussed previously it may be possible for capacity allocations to be changed only incrementally towards target allocations. This can have the effect of reducing over-shoots, by damping capacity allocation changes, thus resulting in more stable capacity allocation changes over time.

Figure 17:
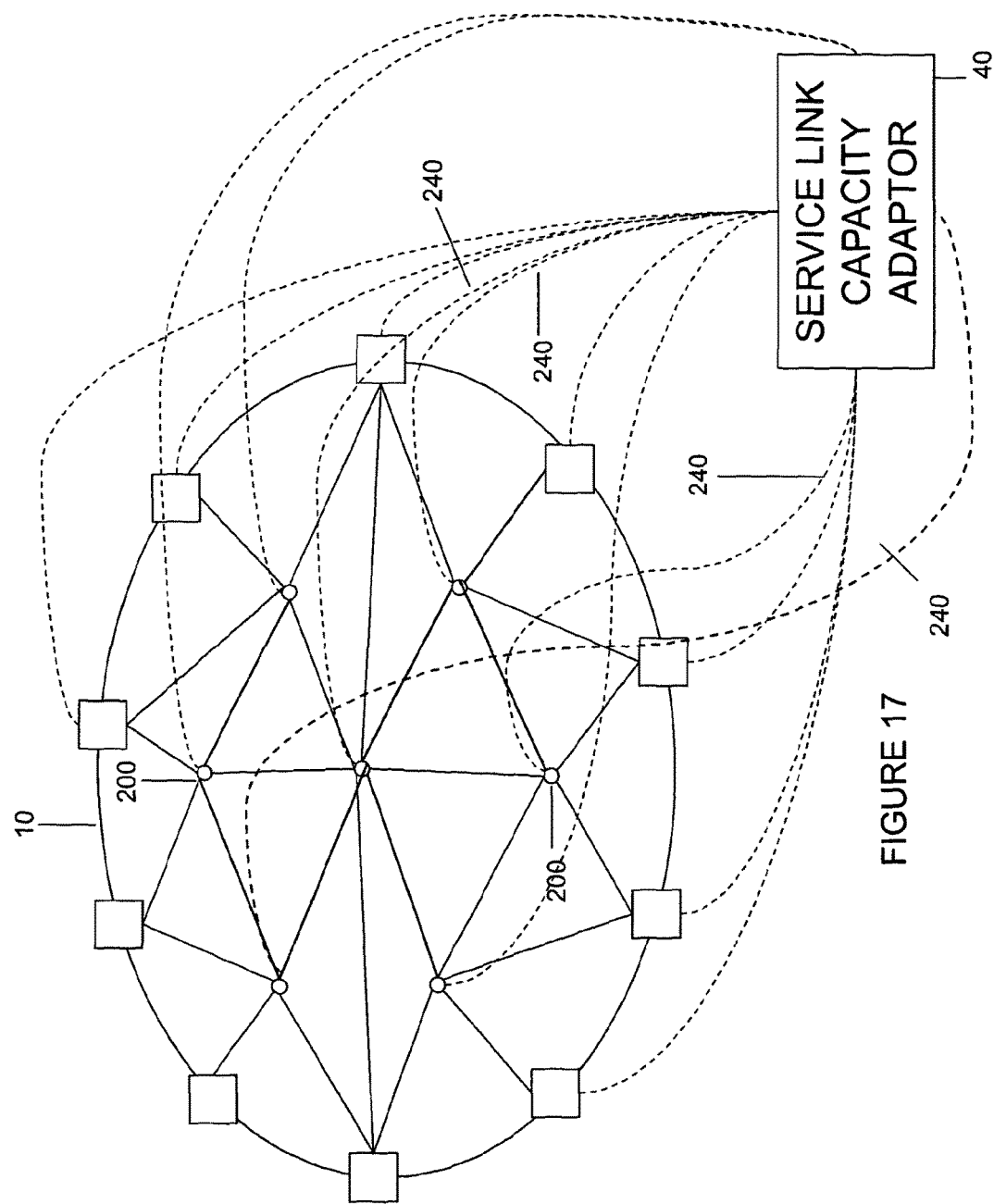
FIG. 17 is a diagram illustrating a central service link capacity adaptor provided by a second embodiment of the invention.

In the above described embodiment the required processing can be performed independently for each link at (blades connected to) the associated routers or switches. However, in a second embodiment shown in FIG. 17 it may also be possible to send the values of the shadow price indications for all classes and all links to a centralised management system which will then compute the new capacity allocations for all links and instruct the various routers and switches to update their local control parameters (in particular the capacity allocations). in this respect, the centralised service capacity adaptor 40 performs the same optimising calculations for each link and each service as described above for one link, but performs them for multiple or substantially all links in the network.

In a further embodiment, a combination may be provided, with some routers or switches calculating their own service capacity allocations for their own links, whilst other routers or switches rely on the centralised service capacity adaptor 40.

Various further modifications, by way of addition, substitution, or deletion, may be made to either of the above described embodiments to provide further embodiments, any and all of which are intended to be encompassed by the appended claims.

The invention claimed is:

1. A method of allocating network capacity between a plurality of services, between a plurality of service classes, or between a plurality of traffic classes, on one or more links between nodes in a packet network, the method comprising:
   a) determining, using at least one computer processor, respective shadow price indications for the plurality of services, for the plurality of service classes, or for the plurality of traffic classes, the shadow price indications being determined in dependence on respective data traffic rates and respective network capacity allocations of the services, of the service classes, or of the traffic classes, on the one or more links using a predetermined shadow price function whereby to be indicative of a marginal value obtainable by an operator of the network from allocating an extra unit of capacity to a service, to a service class, or to a traffic class;
   b) calculating respective target capacity allocations for the plurality of services, for the plurality of service classes, or for the plurality of traffic classes, in dependence on the determined respective shadow price indications; and
   c) in dependence on the calculated target capacity allocations, updating the respective capacity allocations for the plurality of services, for the plurality of service classes, or for the plurality of traffic classes, at least partially towards the calculated target capacity allocations;
   wherein the plurality of services, the plurality of service classes, or the plurality of traffic classes, are then operated with the updated network capacity allocations.

2. The method according to claim 1, wherein the target capacity allocations are calculated so as to increase and/or maximise value obtained from transmission of data packets in the services, in the service classes, or in the traffic classes.

3. The method according to claim 1, wherein the calculating further comprises calculating respective target capacity allocations in dependence on the determined respective shadow price indications and respective existing capacity allocations.

4. The method according to claim 3, wherein the calculating comprises finding respective value measures for the respective services, for the respective service classes, or for the respective traffic classes, in dependence on the respective shadow price indications and the respective existing capacity allocations, and allocating a proportion of capacity to a service, to a service class, or to a traffic class, in dependence on the ratio of its respective value measure to the sum of value measures for the plurality of services, for the plurality of service classes, or for the plurality of traffic classes.

5. The method according to claim 4, wherein a respective value measure for a service, for a service class, or for a traffic class, is the product of the respective shadow price indication and existing capacity allocation for the service, for the service class, or for the traffic class.

6. The method according to claim 1, wherein the updating comprises altering the capacity allocation towards the target capacity allocation according to a step-size coefficient determining how far towards the target capacity allocation an existing capacity allocation is altered.

7. The method according to claim 1, wherein the shadow price indication is determined from a shadow price function that relates a shadow price indication for a service, for a service class, or for a traffic class, to data traffic rate and capacity allocation for that service, for that service class, or for that traffic class, the method further comprising adaptively updating the shadow price function to take into account the updated capacity allocations, and then repeating functions a) to c).

8. A non-transitory computer readable medium storing a computer program or at least one of a suite of computer programs such that when executed by a computer it/they cause the computer to operate according to the method of claim 1.

9. A system for allocating network capacity between a plurality of services, between a plurality of service classes, or between a plurality of traffic classes, on one or more links between nodes in a packet network, the system comprising:
a) at least one shadow price indication calculator arranged to determine respective shadow price indications for the plurality of services, for the plurality of service classes, or for the plurality of traffic classes, the shadow price indications being determined in dependence on respective data traffic rates and respective network capacity allocations of the services, of the service classes, or of the traffic classes, on the one or more links using a predetermined shadow price function whereby to be indicative of a marginal value obtainable by an operator of the network from allocating an extra unit of capacity to a service, to a service class, or to a traffic class;
b) at least one service capacity adaptor arranged to calculate respective target capacity allocations for the plurality of services, for the plurality of service classes, or for the plurality of traffic classes, in dependence on the determined respective shadow price indications; and
c) at least one service controller arranged to update the respective capacity allocations for the plurality of services, for the plurality of service classes, or for the plurality of traffic classes, at least partially towards the calculated target capacity allocations, in dependence on the calculated target capacity allocations;
wherein the plurality of services, the plurality of service classes, or the plurality of traffic classes, are then operated with the updated network capacity allocations.

10. The system according to claim 9, wherein the target capacity allocations are calculated so as to increase and/or maximise value obtained from transmission of data packets in the services, in the service classes, or in the traffic classes.

11. The system according to claim 9, wherein the service capacity adaptor is further arranged to calculate respective target capacity allocations in dependence on the determined respective shadow price indications and respective existing capacity allocations.

12. The system according to claim 11, wherein the service capacity adaptor is further arranged to find respective value measures for the respective services, for the respective service classes, or for the respective traffic classes, in dependence on the respective shadow price indications and the respective existing capacity allocations, and to allocate a proportion of capacity to a service, to a service class, or to a traffic class, in dependence on the ratio of its respective value measure to the sum of value measures for the plurality of services, for the plurality of service classes, or for the plurality of traffic classes.

13. The system according to claim 9, wherein the at least one service controller is further arranged to alter the capacity allocation towards the target capacity allocation according to a step-size coefficient determining how far towards the target capacity allocation an existing capacity allocation is altered.

14. An apparatus, comprising:
at least one processor; and
at least one memory including computer program code;
the at least one memory and the computer program code configured to, with the at least one processor, cause the apparatus to perform at least the following:
allocate network capacity between a plurality of services, between a plurality of service classes, or between a plurality of traffic classes, on one or more links between nodes in a packet network, by at least:
a) determining respective shadow price indications for the plurality of services, for the plurality of service classes, or for the plurality of traffic classes, the shadow price indications being determined in dependence on respective data traffic rates and respective network capacity allocations of the services, of the service classes, or of the traffic classes, on the one or more links using a predetermined shadow price function whereby to be indicative of a marginal value obtainable by an operator of the network from allocating an extra unit of capacity to a service, to a service class, or to a traffic class;
b) calculating respective target capacity allocations for the plurality of services, for the plurality of service classes, or for the plurality of traffic classes, in dependence on the determined respective shadow price indications; and
c) in dependence on the calculated target capacity allocations, updating the respective capacity allocations for the plurality of services, for the plurality of service classes, or for the plurality of traffic classes, at least partially towards the calculated target capacity allocations;
wherein the plurality of services, the plurality of service classes, or the plurality of traffic classes, are then operated with the updated network capacity allocations.

15. The apparatus according to claim 14, wherein the target capacity allocations are calculated so as to increase and/or maximise value obtained from transmission of data packets in the services, in the service classes, or in the traffic classes.

16. The apparatus according to claim 14, wherein the apparatus is further caused to calculate respective target capacity allocations in dependence on the determined respective shadow price indications and respective existing capacity allocations.

17. The apparatus according to claim 16, wherein the apparatus is further caused to find respective value measures for the respective services, for the respective service classes, or for the respective traffic classes, in dependence on the respective shadow price indications and the respective existing capacity allocations, and to allocate a proportion of capacity to a service, to a service class, or to a traffic class, in dependence on the ratio of its respective value measure to the sum of value measures for the plurality of services, for the plurality of service classes, or for the plurality of traffic classes.

18. The apparatus according to claim 14, wherein the apparatus is further caused to alter the capacity allocation towards the target capacity allocation according to a step-size coefficient determining how far towards the target capacity allocation an existing capacity allocation is altered.

* * * * *